(12) United States Patent
Getzlaf et al.

(10) Patent No.: US 10,711,524 B2
(45) Date of Patent: Jul. 14, 2020

(54) CASING FLOAT TOOL

(71) Applicant: NCS Multistage Inc., Calgary, Alberta (CA)

(72) Inventors: Donald Getzlaf, Calgary (CA); Marty Stromquist, Calgary (CA); John Ravensbergen, Alberta (CA); David Devlin, Calgary (CA); Douglas Braden, Calgary (CA); Travis Harris, Houston, TX (US)

(73) Assignee: NCS MULTISTAGE INC., Calgary, Alberta (CA)

(*) Notice: Subject to any disclaimer, the term of this patent is extended or adjusted under 35 U.S.C. 154(b) by 188 days.

(21) Appl. No.: 15/421,222

(22) Filed: Jan. 31, 2017

(65) Prior Publication Data

US 2017/0138153 A1 May 18, 2017

Related U.S. Application Data

(62) Division of application No. 13/930,683, filed on Jun. 28, 2013, now Pat. No. 9,593,542.

(Continued)

(51) Int. Cl.
*E21B 7/20* (2006.01)
*E21B 33/14* (2006.01)
(Continued)

(52) U.S. Cl.
CPC .............. *E21B 7/20* (2013.01); *E21B 17/08* (2013.01); *E21B 17/14* (2013.01); *E21B 21/10* (2013.01);
(Continued)

(58) Field of Classification Search
CPC .......... E21B 7/20; E21B 17/14; E21B 33/146
See application file for complete search history.

(56) References Cited

U.S. PATENT DOCUMENTS

| 244,042 A | 7/1881 | Farrar |
|---|---|---|
| 2,008,818 A | 7/1935 | Corbett |

(Continued)

FOREIGN PATENT DOCUMENTS

| CA | 2148169 C | 12/1996 |
|---|---|---|
| CA | 2587395 C | 10/2012 |

(Continued)

OTHER PUBLICATIONS

Rogers, H. E., Bolado, D. L., & Sullaway, B. L. (Jan. 1, 1998). Buoyancy Assist Extends CasingReach in Horizontal Wells. Society of Petroleum Engineers. (Year: 1998).*

(Continued)

*Primary Examiner* — Tara E Schimpf

(57) ABSTRACT

A rupture disc assembly and a float tool incorporating the rupture disc assembly is disclosed. The rupture disc assembly may include a rupture disc assembly comprising a rupture disc, an upper tubular portion and a lower tubular portion, and a securing mechanism for holding the rupture disc between the upper and lower tubular portions. A float tool for creating a buoyant chamber in a casing string may include the rupture disc assembly and a sealing device for sealing the lower end of the casing string, the buoyant, sealed chamber may be created there between. In operation, applied fluid pressure causes the rupture disc to move downward. The rupture disc may be shattered by contact with a surface on the lower tubular portion. Full casing internal diameter may be restored in the region where the rupture disc formerly sealed the casing.

6 Claims, 7 Drawing Sheets

Related U.S. Application Data

(60) Provisional application No. 61/761,070, filed on Feb. 5, 2013.

(51) Int. Cl.
  *E21B 21/10* (2006.01)
  *E21B 17/14* (2006.01)
  *E21B 34/06* (2006.01)
  *E21B 17/08* (2006.01)

(52) U.S. Cl.
  CPC ............ *E21B 33/14* (2013.01); *E21B 33/146* (2013.01); *E21B 34/063* (2013.01)

(56) References Cited

U.S. PATENT DOCUMENTS

| | | | |
|---|---|---|---|
| 2,117,318 | A | 5/1938 | Hanes |
| 2,565,731 | A | 8/1951 | Luther |
| 3,015,469 | A | 1/1962 | Falk |
| 3,207,184 | A | 9/1965 | Lambert |
| 3,406,864 | A | 10/1968 | Schmidt |
| 3,467,271 | A | 9/1969 | Kaiser et al. |
| 3,533,241 | A | 10/1970 | Bowerman et al. |
| 3,779,263 | A | 12/1973 | Edwards et al. |
| 3,831,680 | A * | 8/1974 | Edwards ............... E21B 21/10 166/311 |
| 3,980,134 | A | 9/1976 | Amancharia |
| 4,218,299 | A | 8/1980 | Lindell et al. |
| 4,510,994 | A | 4/1985 | Pringle |
| 4,512,491 | A | 4/1985 | DeGood et al. |
| 4,541,484 | A | 9/1985 | Salerni et al. |
| 4,553,559 | A | 11/1985 | Short |
| 4,605,074 | A | 8/1986 | Barfield |
| 4,658,902 | A | 4/1987 | Wesson et al. |
| 4,664,184 | A | 5/1987 | Grigar |
| 4,683,943 | A | 8/1987 | Hill et al. |
| 4,683,956 | A | 8/1987 | Russell |
| 4,691,775 | A | 9/1987 | Lustig et al. |
| 4,739,799 | A | 4/1988 | Carney et al. |
| 4,813,481 | A | 3/1989 | Sproul et al. |
| 4,969,524 | A | 11/1990 | Whiteley |
| 5,012,867 | A | 5/1991 | Kilgore |
| 5,050,630 | A | 9/1991 | Farwell et al. |
| 5,188,182 | A | 2/1993 | Echols |
| 5,281,270 | A | 1/1994 | Totien et al. |
| 5,479,986 | A * | 1/1996 | Gano ............... E21B 23/00 166/192 |
| 5,511,617 | A | 4/1996 | Snider et al. |
| 5,607,017 | A | 3/1997 | Owens et al. |
| 5,829,526 | A | 11/1998 | Rogers et al. |
| 5,924,696 | A * | 7/1999 | Frazier ............... E21B 34/063 138/90 |
| 5,947,204 | A | 9/1999 | Barton |
| 6,076,600 | A | 6/2000 | Vick et al. |
| 6,220,350 | B1 | 4/2001 | Brothers et al. |
| 6,334,488 | B1 | 1/2002 | Freiheit |
| 6,397,950 | B1 | 6/2002 | Stretch et al. |
| 6,634,430 | B2 | 10/2003 | Dawson et al. |
| 6,799,634 | B2 | 10/2004 | Hartog et al. |
| 7,044,230 | B2 | 5/2006 | Starr |
| 7,090,027 | B1 | 8/2006 | Williams |
| 7,168,494 | B2 | 1/2007 | Starr |
| 7,210,533 | B2 | 5/2007 | Starr |
| 7,287,596 | B2 | 10/2007 | Frazier |
| 7,350,582 | B2 | 4/2008 | McKeachnie et al. |
| 7,455,116 | B2 | 11/2008 | Lembcke |
| 7,624,796 | B2 | 12/2009 | Hassel-Sorensen |
| 7,640,984 | B2 | 1/2010 | Vert et al. |
| 7,661,480 | B2 | 2/2010 | Ammal |
| 7,708,066 | B2 | 5/2010 | Frazier |
| 7,757,764 | B2 | 7/2010 | Vert et al. |
| 7,798,236 | B2 | 9/2010 | McKeachnie |
| 7,806,189 | B2 | 10/2010 | Frazier |
| 8,424,605 | B1 | 4/2013 | Schultz et al. |
| 8,833,154 | B2 | 9/2014 | Skillingstad |
| 9,194,209 | B2 | 11/2015 | Frazier |
| 9,291,031 | B2 | 3/2016 | Frazier |
| 9,739,114 | B2 | 8/2017 | Frazier |
| 10,184,316 | B2 | 1/2019 | Flores Perez et al. |
| 10,458,201 | B2 | 10/2019 | Frazier |
| 10,465,445 | B2 | 11/2019 | Getzlaf et al. |
| 2001/0022194 | A1 | 9/2001 | Davis et al. |
| 2003/0127224 | A1 | 7/2003 | Vick, Jr. et al. |
| 2003/0168214 | A1 | 9/2003 | Sollesnes |
| 2006/0048936 | A1 | 3/2006 | Fripp et al. |
| 2007/0215361 | A1 | 9/2007 | Pia |
| 2007/0246211 | A1 | 10/2007 | Schneider et al. |
| 2007/0284119 | A1 | 12/2007 | Jackson |
| 2008/0115942 | A1 * | 5/2008 | Keller ............... E21B 34/06 166/380 |
| 2008/0271898 | A1 | 11/2008 | Turley |
| 2009/0020290 | A1 | 1/2009 | Ross |
| 2009/0056955 | A1 | 3/2009 | Slack |
| 2011/0253387 | A1 | 10/2011 | Ervin |
| 2011/0315398 | A1 | 12/2011 | Ueland |
| 2015/0068730 | A1 | 3/2015 | Frazier |
| 2016/0281455 | A1 | 9/2016 | Brandsdal et al. |
| 2017/0138153 | A1 | 5/2017 | Getzlaf et al. |
| 2017/0314363 | A1 | 11/2017 | Frazier |
| 2018/0334878 | A1 | 11/2018 | Hiorth |
| 2018/0371869 | A1 | 12/2018 | Kellner et al. |
| 2019/0106983 | A1 | 4/2019 | Elbadawy |
| 2019/0136666 | A1 | 5/2019 | Kent |
| 2019/0352995 | A1 * | 11/2019 | Giroux ............... E21B 34/063 |

FOREIGN PATENT DOCUMENTS

| | | |
|---|---|---|
| CA | 3043410 A1 | 11/2019 |
| GB | 688727 | 3/1953 |

OTHER PUBLICATIONS

Composite Catalog of Oil Field Equipment and Services, 35th Revision 1982-83, Published by World Oil, A Gulf Publishing Company Publication, Copyright 1982 by Gulf Publishing Company, Hallibuton Services, Sales and Service Catalog No. 41, Surge Perforation Cleaning, pp. 4019-4020.

Core Lab, Owen Oil Tools, Magnum Ported Underbalance Sub, Supplied by Magnum Oil Tools, Copyright 2007 Owen Oil Tools, Last Revised Sep. 2012, MAG-01.MUDA.278.8EBP, 01.MSRK.278.9999, 2 pages.

Magnum Oil Tools International, Oil and Gas Online, "Single MagnumDisk", Jun. 21, 2011, 2 pages.

H. E. Rogers, D. L. Bolado, and B. L. Sullaway, "Buoyancy Assist Extends Casing Reach in Horizontal Wells", SPE 50680, Copyright 1998, Society of Petroleum Engineers, Inc., Prepared for presentation at the 1998 European Petroleum Conference in the Hague, Oct. 20-22, 8 pages.

Core Lab, Owen Oil Tools, Technical Information: Differential Plug, TC-82 (R01), Copyright 2007 Owen Oil Tools, www.corelab.com/owen, 3 pages.

Core Lab, Owen Oil Tools, Surge Tool, Ported Underbalance Sub, TC-091-2375-200 & 000, TC-091-2875-200 & 000, Revised Jun. 2002, TC-091-0.3, TC-091-0.4, TC-091-0.5, 3 pages.

Core Lab Reservoir Optimization, Owen Oil Tools, Differential Sub, Non Ported, TC-080-2375-000, TC-080-2875-000, TC-080-3500-000, Revised Sep. 2004, Copyright 2004 Owen Oil Tools, TC-080-0.3, TC-080-0.4, pp. 79-80.

Core Lab Reservoir Optimization, Owen Oil Tools, Differential Sub, Ported, TC-081-2375-000, TC-081-2875-000, TC-081-3500-000, Revised Sep. 2004, Copyright 2004 Owen Oil Tools, TC-081-0.3, TC-081-0.4, pp. 81-82.

Core Lab Reservoir Optimization, Owen Oil Tools, Surge Tool, Underbalance Sub, TC-090-2375-200 & 000, TC-090-2875-200 & 000, Revised Jun. 2002, Copyright 2004 Owen Oil Tools, TC-090-0.3, TC-090-0.4, TC-090-0.5, pp. 83-85.

(56) References Cited

OTHER PUBLICATIONS

Core Lab Reservoir Optimization, Owen Oil Tools, Surge Tool, Ported Underbalance Sub, TC-091-2375-200 & 000, TC-091-2875-200 & 000, Revised Jun. 2002, Copyright 2004 Owen Oil Tools, TC-091-0.3, TC-091-0.4, TC-091-0.5, pp. 87-89.

Core Lab Reservoir Optimization, Owen Oil Tools, Drop Bar, Slim Nose, TC-130, Drop Bar, Slim Nose Brass Button, TC-132, Revised Apr. 2004, Copyright 2004 Owen Oil Tools, TC-130-0.3, TC-130-0.4, pp. 99-100.

Core Lab Reservoir Optimization, Owen Oil Tools, Roller Drop Bar Slim Nose, TC-133-134, Revised Apr. 2004, Copyright 2004 Owen Oil Tools, TC-133-0.3, TC-133-0.4, pp. 101-102.

Core Lab Reservoir Optimization, Owen Oil Tools, Drop Bar, Sectional Wide Nose, TC-136, Drop Bar, Solid Wide Nose, TC-138, Revised Jun. 2002, Copyright 2004 Owen Oil Tools, TC-136-138-0.3, TC-136-138-0.4, pp. 103-104.

Society of Petroleum Engineers Inc., SPE 88738, Implementations of New Technologies for Oil and Gas Industry, Moh'd Mamdouh Shaker et al., 8 pages, Oct. 10, 2004.

Society of Petroleum Engineers Inc., SPE/IADC 148541, Buoyancy Technology Used Effectively in Casing Running Operations to Extend Lateral Stepout: Two Case Histories Detail Application Risks and Successes, Hank Rogers et al., 12 pages, Oct. 24, 2011.

Society of Petroleum Engineers Inc., SPE/IADC 119373, Increasing Sakhalin Extended Reach Drilling and Completion Capability, Michael W. Walker et al., 14 pages, Mar. 17, 2009.

Oilfield Review, Extended-Reach Drilling: Breaking the 10-km Barrier, Frank Allen et al., 16 pages, Dec. 31, 1997.

Society of Petroleum Engineers Inc., SPE 23741, Mechanical Fluid Loss Control Systems Used During Sand Control Operations, H. L. Restarick, 11 pages, Mar. 8, 1992.

Society of Petroleum Engineers Inc., SPE/IADC 105839, Floatation of 10 3/4-in. Liner—A Method Used to Reach Beyond 10 km, Johan Eck-Olsen et al., 9 pages, Feb. 22, 2007.

* cited by examiner

CASING FLOAT TOOL

CROSS-REFERENCE TO RELATED APPLICATIONS

This application is a division of U.S. application Ser. No. 13/930,683 filed on Dec. 4, 2014, which claims the benefit of U.S. Provisional Application No. 61/761,070 filed on Feb. 5, 2013, the disclosures of which are hereby incorporated by reference in their entireties.

FIELD OF THE INVENTION

This invention relates to a method and apparatus for sealing well casings.

BACKGROUND

In many wells, it may be difficult to run the casing to great depths because friction between the wellbore and the casing often results in a substantial amount of drag. This is particularly true in horizontal and/or deviated wells. In some cases, the drag on the casing can exceed the available weight in the vertical section of the wellbore. If there is insufficient weight in the vertical portion of the wellbore, it may be difficult or impossible to overcome drag in the wellbore.

Various attempts have been made to overcome this drag and achieve greater well depths and/or to achieve a horizontal well. For example, techniques to alter wellbore geometry are available, but these techniques can be time-consuming and expensive. Techniques to lighten or "float" the casing have been used to extend the depth of well. For example, there exists techniques in which the ends of a casing string portion are plugged, the plugged portion is filled with a low density, miscible fluid to provide a buoyant force. After the plugged portion is placed in the wellbore, the plugs must be drilled out, and the low density miscible fluid is forced out into the wellbore. The extra step of drilling out increases completion time. Some flotation devices require a packer to seal the casing above the air chamber. In these cases, the chamber is sealed at its upper end by a packer. The packer may be removed from the casing string using a conventional drill-type workstring, for example.

In many casing float techniques and devices, it may not be possible to achieve full casing ID (inside diameter) following the opening of the air chamber. It is desirable to achieve full casing ID so that downhole tools can be conveyed to this region of the casing string and so that operations, such as cementing can be easily carried out using conventional ball-drop techniques, or other conventional techniques. Also, many float devices require the use of specialized float shoes and/or float collars.

It would be desirable to have a flotation chamber (also referred to herein as a "float chamber" or "buoyant chamber") which is easy and relatively inexpensive to install on a casing string and which can be used with conventional float equipment such as float shoes and float collars, and with conventional equipment such as landing collars and cementing plugs. Further, it would be desirable if the parts of the float chamber could be easily removed from the wellbore and/or that the removal could result in full casing ID so that various downhole operations could be readily performed following removal or opening of the buoyant chamber.

BRIEF SUMMARY

Generally, this disclosure relates to an improved rupture disc assembly and improved rupture disc within the assembly wherein the rupture disc, when installed in the wellbore, can be ruptured by engagement with an impact surface of a tubular once a rupturing force is applied to the disc, such as by hydraulic fluid under pressure. The disc can be impelled to impact against this impact surface, and rupture as a result.

For example, the disc may be engaged within the casing string by a securing mechanism, which may be a shear ring. When freed from the constraints of the securing mechanism, the disc shatters against an impact surface within the casing string (e.g. a surface of a tubular). Hydraulic pressure does not cause rupture of the disc all by itself. Rather, hydraulic pressure causes disruption or shearing of the securing mechanism, such that the rupture disc is shattered by engagement against an impact surface within the casing string. The hydraulic pressure required to cause disruption of the securing mechanism is less than the hydraulic pressure that would normally be required to break the rupture disc. The engagement of the disc against the impact surface (the disc being impelled against the impact surface) allows the disc to rupture at lower pressure than would generally be required if hydraulic pressure alone was the sole mechanism for rupturing the disc, thereby allowing less hydraulic pressure to be required for the disc to be ruptured. Also, as will be described below, this allows the disc to be broken into suitably-sized pieces that will not affect wellbore equipment such as float devices.

There is no need to send weights, sharp objects or other devices (e.g. drop bars or sinker bars) down the casing string to break the rupture disc. Nor is there a need for complicated tubular arrangements, such as sliding sleeves to break the rupture disc. Such sleeves do not tend to break the disc into sufficiently small pieces. In the present arrangement, the rupture disc and rupture disc assembly can be so arranged that the rupture disc gets broken in sufficiently small pieces that the disc pieces can be removed by fluid circulation, without damaging the casing string. In addition, full casing ID (inside diameter) is restored after the rupture disc is broken, so that there is no need to drill out any part of the device. This full casing ID is useful for use in ball-drop systems. Once the disc has ruptured, normal operations, such as cementing, may be performed. The device is straight-forward to install, avoids the cost and complexity of many known casing flotation methods and devices, and decreases completion time.

According to one aspect, the rupture disc assembly comprises an upper tubular member, and a lower tubular member coupled with the upper tubular member. The rupture disc is held in sealing engagement between the upper tubular member and the lower tubular member by a securing mechanism. The rupture disc is secured above or within the lower tubular member such that the rupture disc can move downward into a constricted area of the lower tubular member in response to hydraulic fluid pressure, and rupture as a result of the impact against the lower tubular member.

In one embodiment, the securing mechanism generally provides a convenient means to fluidically seal the rupture disc within the casing string, and essentially, to facilitate rupturing of the disc, by the mechanisms described herein. In one example, the securing mechanism is a shear ring, the shear ring having a continuous side surface and a circumferential aperture. The lower circumferential edge of the shear ring includes a plurality of tabs inwardly extending into the aperture. Generally, the threshold shearing pressure of the tabs is less than the rupture burst pressure of the disc (e.g. the pressure at which hydraulic pressure alone causes rupture of the disc), so that the tabs are sheared before the disc is shattered. The shearing allows sudden or rapid free movement of the disc in the direction of the lower tubular member, so that the disc can be shattered by impact.

It is desirable for the rupture disc to be shattered into sufficiently small pieces that the shattered pieces do not damage the casing string, and so that the pieces do not clog equipment (such as the float shoe) within the casing string. To accomplish this, various configurations of the rupture disc may be employed. For example, the rupture disc may have a pattern of grooves etched on the outer surface of the dome, the grooves providing lines of weakness to facilitate breakage of the disc into suitably-sized pieces. The thickness of the rupture disc may also be such as to improve the breakability characteristics. The small size of the pieces allow the rupture disc assembly to be used with ball-drop systems (typically, the smallest ball drop is less than one inch).

According to one embodiment, the float tool may further comprise a debris catcher disposed on the casing string downhole of the disc to catch the disc pieces after the disc has been broken.

Various embodiments include an improved float tool for creating a buoyant chamber in a casing string, wherein the float tool comprises the above-described rupture disc assembly; a method that utilizes the present rupture disc assembly to first seal, and then unseal, a well casing; a method that utilizes the present rupture disc assembly as part of the installation of a casing; a method that utilizes the present rupture disc assembly as part of the running in of a casing string into a wellbore.

BRIEF DESCRIPTION OF THE SEVERAL VIEWS OF THE DRAWING(S)

DETAILED DESCRIPTION

In the following description, directional terms such as "above", "below", "upper", "lower", "uphole", "downhole", etc. are used for convenience in referring to the accompanying drawings. One of skill in the art will recognize that such directional language refers to locations in downhole tubing either closer or farther from the wellhead and that various embodiments of the present invention may be utilized in various orientations, such as inclined, deviated, horizontal, vertical, etc.

Float Tool

Figure 1:
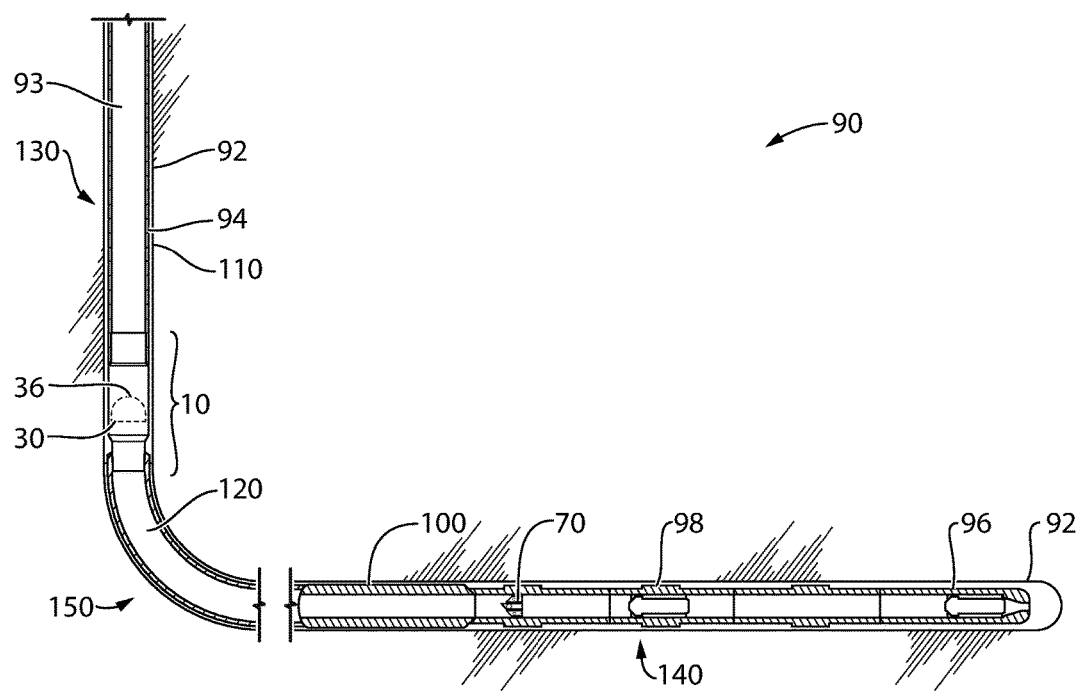
FIG. 1 is a cross-sectional view of a float tool according to one embodiment installed within a casing string in a wellbore having both vertical and horizontal portions.

Referring to the drawings, FIG. 1 shows an embodiment of a float tool, generally designated by the numeral 90, after the float tool has been run into wellbore 92. Float tool 90 is installed within casing string 94. An annulus 110 may be defined between the casing and the wellbore 92.

According to this embodiment, float tool 90 includes a rupture disc assembly 10. In the illustrated embodiment, rupture disc assembly 10 is installed in the vertical portion 130 of wellbore 92, proximal to the bend 150 leading to the horizontal portion 140 of the wellbore. Variations in the placement of the rupture disc assembly are possible. Generally, the rupture disc assembly should be installed such to maximize vertical weight on the casing string, while minimizing horizontal weight. Rupture disc assembly 10 forms a temporary isolation barrier, isolating a fluid-filled, upper section of the string 93 from a sealed, buoyant chamber 120 formed in the string between the rupture disc assembly 10 and a sealing device, such as a float shoe 96 disposed at the lower end of the casing string.

Float shoe 96 forms the lower boundary of buoyant chamber 120. As will be appreciated, an alternative float device, such as a float collar, may be used as a substitute for float shoe 96, or may be used in addition to float shoe 96. Float shoes, float collars and similar devices are herein referred to as "float devices". In the illustrated embodiment, both a float shoe 96 and float collar 98 are included. Float collar 98 may be positioned uphole of the float shoe 96. When present, the float collar serves as a redundant fluid inflow prevention means. The float collar is similar in construction to the float shoe, including a valve (not shown) that prevents wellbore fluid from entering the buoyant chamber. Similarly, the float shoe generally includes a check valve (not shown) that prevents inflow of fluid from the wellbore during running in or lowering the casing string into the wellbore.

Float shoes are generally known in the art. For example, U.S. Pat. Nos. 2,117,318 and 2,008,818 describe float shoes. Float shoes may be closed by assistance with a spring. Once closed, pressure outside the float shoe may keep the shoe closed. In some float shoes, its check valve can be opened when fluid flow through the casing string is desired, for example, when cementing operations are to begin. In some cases, the float shoe may be drilled out after run-in is complete. When present, the float collar often has a landing surface for a wiper displacement plug. In addition to a float shoe and/or float collar, a baffle collar and/or guide shoe may be present. The present float tool 90, and the rupture disc assembly 10 therein, may be adapted to be compatible with most float shoes, landing collars and float collars.

Buoyant chamber 120 in float tool 90 may be created as a result of sealing of the lower end of casing string 94 with float shoe 96 and sealing of an upper end of casing string 94 with rupture disc assembly 10. Rupture disc assembly 10 includes a rupture disc 30 that will be ruptured at a subsequent point in time, as will be discussed below. Rupture disc 30 is generally a hemispherical dome, having a convex surface 36 oriented in the up-hole direction, and having a burst or rupture pressure (e.g. the pressure at which hydraulic pressure alone can break the disc) greater than the hydraulic pressure in the casing string when the casing string is being run, so as to avoid premature breakage of the disc. The distance between float shoe 96 and rupture disc assembly 10 is selected to control the force tending to run the casing into the hole, and to maximize the vertical weight of the casing string, as noted above.

Optionally, a debris catcher 70 may be installed downhole of rupture disc assembly 10, generally in the horizontal portion 140 of the wellbore 92. The debris catcher may be any suitable means for capturing pieces of the rupture disc, once shattered. For example, a filter, a baffle, a screen, etc. may be used as the debris catcher. In the illustrated embodiment, a particular type of debris catcher 70 is shown, with projections on debris catcher 70 facing uphole so as to capture debris from rupture disc 30. The debris catcher can be installed into the casing string by threaded connection, between a landing collar 100 and a pup joint (not shown), when present. Further illustrative details of debris catcher 70 are presented hereinbelow.

More particularly, landing collar 100 may be positioned between sealing device 96 and rupture disc assembly 10. The landing collar may be present on the surface of the float collar, when present. Landing collar 100 may be generally used in cementing operations for receiving cementing plugs, such as a wiper plug. Suitable landing collars are known in the art, and float tool 100 does not require that a particular landing collar be used, so long as the landing collar has surface for receiving a plug and so long as the landing collar can be suitably installed on the casing string.

The region of the casing string between rupture disc assembly 10 and float shoe 96 has increased buoyancy. The casing in this region may be air-filled. When this is the case, there is no need to fill the casing string with fluid prior to running the casing string in, and there is no need to substitute the air in the casing once installed in the well. However, fluids of lesser density than the fluid in the upper casing string 93 may be used. For example, the buoyant chamber may be filled with a gas such as nitrogen, carbon dioxide or air, and other gases may also be suitable. Light liquids may also be used. Generally, the buoyant chamber must be filled with fluid that has a lower specific gravity than the well fluid in the wellbore in which it is run, and generally, the choice of which gas or liquid to use, is dependent on factors such as the well conditions and the amount of buoyancy desired. In order to fill the casing string with the lighter fluid or gas, the casing string may be sealed with the float device, the landing collar installed, and the casing ran into the wellbore with air. The air may then be flushed out, and the string filled with the gas or liquid from surface, prior to installing the rupture burst assembly. The buoyancy of the buoyant chamber assists in running the casing string to the desired depth.

Method of Installing Casing String

The float tool, and thus rupture disc assembly 10, may be used in a method of installing a casing string, and in a method to float a casing. As noted above, running a casing string in deviated wells and in long horizontal wells can result in significantly increased drag forces. A casing string may become stuck before reaching the desired location. This is especially true when the weight of the casing in the wellbore produces more drag forces than the weight tending to slide the casing down the hole. When too much force is applied to push the casing string into the well, this can result in damage to the casing string. The present float tool helps to address some of these problems.

In the method of installing a casing string, the casing string 94 is initially made up at the surface. For example, when present, the debris catcher 70 is generally connected with the float shoe and/or float collar (e.g. the debris catcher 70 generally can be threadedly connected to float shoe 96). There may be one or more pup joints or similar piping installed. The landing collar is then installed on the casing string. Drilling mud may be added to ensure that the float shoe 96 is functioning properly. No fluid is added to the casing prior to installing the rupture disc assembly (unless that a liquid or a gas other than air is to be used). Once a desired amount of casing is run into the wellbore, rupture disc assembly 10 is installed. The remaining casing is run in, filling the casing with mud.

The casing string, including float tool 90, is run into wellbore 91 until the friction drag on the casing string 94 with the walls of wellbore 92 will not allow the casing string to be run to a greater depth. When run to the desired or maximum depth, float shoe 96 may be located close to the "toe" or bottom of the wellbore 92. Rupture disc assembly 10 may be positioned in the vertical section 130 of the well. The vertical weight of the casing string assists in overcoming drag on the casing string, allowing the casing string to be positioned to a greater depth, and/or to be moved horizontally in the wellbore. The hydrostatic pressure during run-in must be less than the rupture burst pressure of rupture disc 30, to prevent premature rupture of the disc. Generally, the rupture disc may have a pressure rating of 10,000 to 30,000 psi, for example.

Once the casing has run and landed, circulating equipment may be installed. The rupture disc is then burst by pressuring the casing from surface. To accomplish this, fluid pressure (e.g., from the surface) is applied through the casing string 94. The fluid exerts force on the convex side 36 of rupture disc 30, and on a securing mechanism holding the rupture disc in place, as discussed in further detail hereinbelow. The force is sufficient to overcome the engagement function of the securing mechanism, causing the disc to suddenly move downward, and shatter against a region of the casing string (such as an impact surface on a tubular), as will be described in more detail below. Once the rupture disc has burst, fluid pumping is continued for a short time, and then stopped. The rupture of the disc should be evident from the surface by observing both movement and sound. There may also be a pressure drop.

After the steps involved in installing the float tool into the wellbore have been performed, and the disc has been shattered, additional operations can be performed. Fluid flow through the casing string following rupture may allow the air or other fluid or gas that was in the buoyant chamber to rise to the surface and be vented from the casing string, for example. The cavity can then be filled with other fluid (e.g. non-flotation fluid). For example, the casing string may be filled with drilling fluid. When float shoe 96 is opened, conventional cementing operations can begin. It is also possible to use the float tool of the present disclosure in reverse cementing operations. In reverse cementing, a cement slurry may be pumped down the annulus 110, rather than through the casing. When cementing operations are performed, a cement plug is delivered through the casing string. The cement plug may assist in sweeping ruptured disc fragments into debris catcher 70. Debris catcher 70 prevents fragments from entering the float shoe and/or float collar. Alternatively, pieces of the shattered disc may be percolated to the surface. Further, because the casing ID is restored, the present method and float tool are ideal for use in ball-drop systems.

Once the disc has been ruptured, the inside diameter of the casing string in the region of the rupture disc assembly 10 is substantially the same as that in the remainder of the casing string (e.g. casing ID (inner diameter) is restored following rupture of the disc). One way to accomplish this may be to have the disc installed in a widened region of the casing string (e.g. within radially expanded portions of one or more tubulars, the tubulars being connectable to other tubulars in the casing string). In other words, the tubular string can be adapted to accommodate the diameter of the rupture disc. The ability to restore full casing ID is useful since downhole tools and the like can be deployed without restriction into the casing string once the disc has been removed, and since further work can be done without the need to remove any part of the float tool.

The rupture happens almost instantaneously or rapidly, and since full casing ID is restored, maximum flow rates can be quickly achieved. Moreover, because the debris is small, there is little danger to the casing string from the ruptured pieces, and the potential for clogging is minimal. Compared to many prior art devices, the present float tool is inexpensive to manufacture. The rupture disc is ruptured by engagement against a region of the casing string (hydraulic pressure shears the engagement of the rupture disc within the one or more tubular, allowing the disc to move downward and shatter). There is no need to drop a weight into the casing string to break the disc, for example. Moreover, there can be various configurations of the rupture disc (grooved or etched disc, disc of thinner thickness) to improve the breakability of the disc. This allows the disc to break into suitably sized pieces that will not impair wellbore function. Generally, it has been observed, that using the various methods and devices disclosed herein, the fragments of the rupture disc may be smaller than about one inch, or less.

Rupture Disc Assembly

Figure 2:
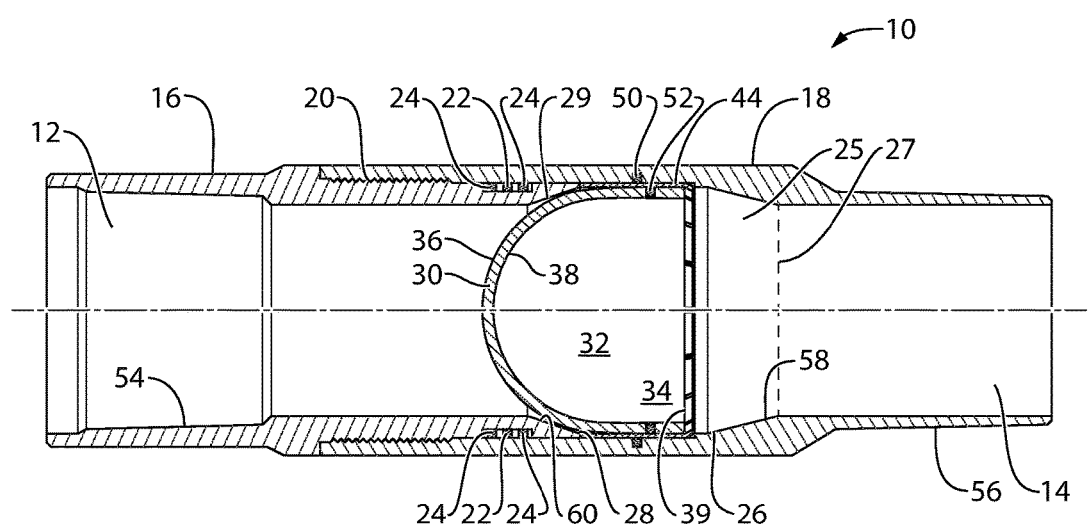
FIG. 2 is a cross-sectional view of a rupture disc assembly according to an embodiment that is adapted for installation in a casing string.
Figure 3:
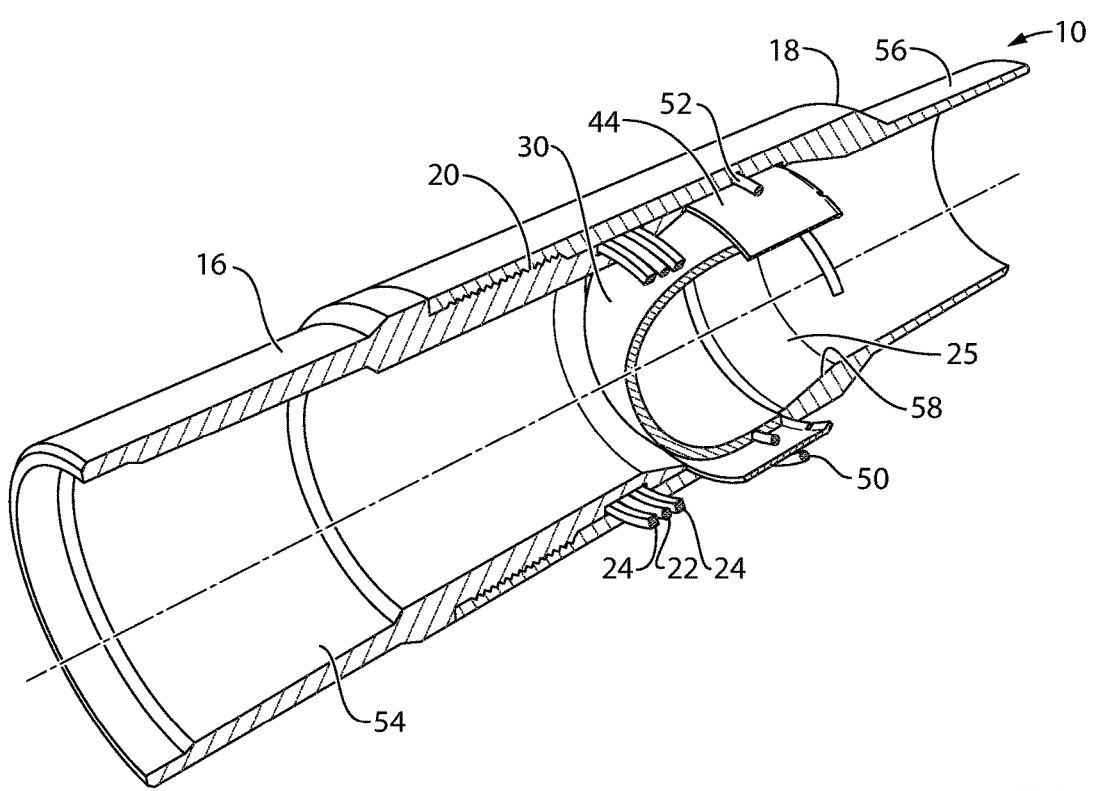
FIG. 3 is schematic, perspective view of a rupture disc assembly according to one embodiment.

FIG. 2 shows an illustrative implementation of rupture disc assembly 10, suitable for installation into the float tool of FIG. 1. The rupture disc assembly 10 may consist of an upper tubular member 16 defining an upper fluid passageway 12 through its interior, coupled to a lower tubular member 18 defining a lower fluid passageway 14 through its interior, and a rupture disc 30 sealingly engaged between upper tubular member 16 and lower tubular member 18. Upper tubular member 16 may be coupled with lower tubular member in such a way that the outer wall of lower tubular member 18 overlaps at least a portion of the outer wall of upper tubular member 16. In the illustrated embodiment, upper tubular member 16 and lower tubular member 18 may be mechanically joined together at 20, which may be a threaded connection. Various other interconnecting means that would be known to a person skilled in the art are possible. A fluid seal between upper tubular member 16 and the lower tubular member 18 may be provided by one or more seals. In the illustrated embodiment, the fluid seal is created by an O-ring seal 22, with flanking back-up seals 24.

Lower tubular member 18 may include a radially expanded region 25 with a tapered internal surface 58, which may be a frusto-conical surface (e.g. lead-in chamfer). The radially expanded region 25 is continuous with a constricted opening (represented by dash line 27), continuous with passageway 14 in lower tubular member 18. As will be discussed below, various surfaces on lower tubular member 18—most notably surface 58—can form impact surfaces for shattering the rupture disc. Although not shown in the Figure, inner surface 54 of upper tubular member 16 may be threaded for connection to other members of the casing string, and outer surface 56 of lower tubular member 18 may also be threaded for connection to other members of the casing string (not shown). These other members of the casing string may have an ID similar to the diameter of the constricted opening 27 of lower tubular member 18. It is noted that the tubulars may be connected to the casing string using various means of connection. Upper tubular member 16 also has a radially expanded portion 29 to help accommodate disc 30.

Rupture disc 30 may be sealingly engaged between upper tubular member 16 and lower tubular member 18, concentrically disposed traverse to the longitudinal axis of the upper and lower tubular members. In the illustrated embodiment, a portion 32 of rupture disc 30 is a hollow, hemispherical dome, with a concave surface 38 that faces downhole and a convex surface 36 that is oriented in the up-hole direction. Hemispherical portion 32 is continuous with cylindrical portion 34 which terminates in a circumferential edge 39 having a diameter that is similar to the inner diameter of the radially expanded region 25 of lower tubular member 18 at shoulder 26.

The upper and lower tubulars can be understood to more generally constitute upper and lower portions of the overall assembly 10.

In the illustrated embodiment, the diameter of disc 30 at edge 39 may be 4.8 inches, for example. The diameter of the top of the radially expanded region 25 of lower tubular member 18 may be similar. The diameter of constricted opening 27 of lower tubular member 18 may be 4.5 inches (which is a common ID for a casing, although other dimensions of both the disc and upper and lower tubular members are possible, provided that the disc seals the lower tubular member and that the disc can be "forced" close to or into the constricted opening of the lower tubular member 18 and/or against the radially expanded portion of lower tubular member 18). In this way, rupture disc is essentially installed within a radially expanded region of the casing string.

Other configurations are possible. For example, the disc 30 may be installed in one tubular, as opposed to being sealingly engaged directly between the upper and lower tubular (or within the lower tubular), as is shown in the illustrative embodiment. In this instance, the lower tubular would still have an impact surface for shattering the disc, including for instance, a radially expanded portion. The lower tubular member is engagable with the upper tubular member at an interface below the disc. The impact surface would still lead into a constricted opening of the lower tubular member, into which the disc would be pushed, once the disc becomes disengaged.

As shown in FIG. 2, a shear ring 44 may be sandwiched between the inner wall of lower tubular member 18 and the walls of cylindrical portion 34 of rupture disc 30. Although FIG. 2 is a cross-sectional view for the most part, shear ring 44 is not depicted in cross-section. The shear ring 44 provides for seating rupture disc 30 in lower tubular member 18, and acts as a disengageable constraint.

Shear ring 44 is an example of a securing mechanism for disc 30, the securing mechanism generally serving the purpose of holding the rupture disc in the lower tubular member (or any tubular member when for example, alternative configurations are used where the disc is not directly between the lower and upper tubular member), helping to seal the rupture disc in the casing string, facilitating the rupture of the disc, and generally being shearable in response to hydraulic pressure (e.g. being shearable or otherwise releasing the rupture disc in response to the application of a threshold hydraulic pressure that is less that the rupture burst pressure of the disc). For example, rather than a shear ring, disc 30 may be held within a tubular or between one or more tubular by shear pins, which serve as a securing mechanism. Alternatively, disc may be held within one or more tubulars by a ring held to one or more tubulars by a shearable device. The use of a device such as shear ring 44 as the disengageable constraint is useful because it precludes the need to make holes within the disc itself—as might be the case if shear pins were used as the securing mechanism—thereby maximizing the fluidic seal. Also, the structure of shear ring 44 facilitates the restoration of casing ID (e.g. no or few portions of the shear ring are left extending into the inner diameter of the casing string, as may be the case when shear pins are used in or as part of the securing mechanism). Also, shear ring 44 has tabs or other projections that can be sheared in response to hydraulic pressure, the tabs being eliminable from the casing string due to their small size and/or material properties that may permit dissolution of the tabs.

Shear ring 44 may be held between shoulder 26 of lower tubular member 18 and end 28 of upper tubular member 16 and may be sealed to lower tubular member 18 by means of a seal, which in the illustrated embodiment is O-ring 50. Rupture disc 30 may be sealed to shear ring 44 by means of a seal, which in the illustrated embodiment is O-ring 52. O-ring 52 may be disposed in a groove or void, circumferentially extending around the cylindrical portion 34 of disc 30. Various back-up ring members may be present. The O-rings ensure a fluid tight seal as between the shear ring, the rupture disc, and the upper and lower tubulars.

Rupture disc 30 is constrained from upward movement by tapered surface 60 on upper tubular member 16. The sealing engagement of rupture disc 30 within shear ring 44 and the sealing engagement of shear ring 44 against the lower tubular member 18 together with seals 22 and 24 create a fluid-tight seal between the upper casing string and the casing string downhole of rupture disc assembly 10.

Although shear ring 44 serves as the disengageable constraint or securing mechanism for rupture disc 30 in the illustrated embodiment, other securing mechanisms to hold the rupture disc 30 in sealing engagement within the casing string may be possible, provided that rupture disc 30 is free to move suddenly downward in the direction of the lower tubular member, when freed or released from the constraints of the securing mechanism. Thus, rupture disc assembly 10 may include any securing mechanism for sealingly engaging rupture disc 30, and preferably, for seating rupture disc 30 against or within lower tubular member 18.

Figure 6:
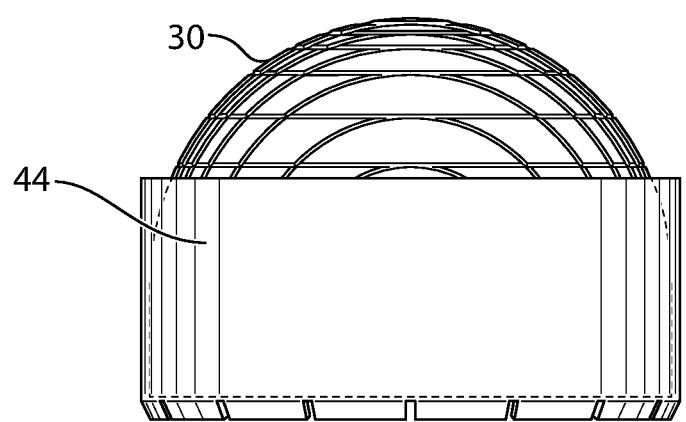
FIG. 6 is a schematic drawing of an etched rupture disc within a shear ring.

As illustrated in FIGS. 2, 3 and 4A through 4C, shear ring 44 may comprise a hollow cylinder 42 with continuous side walls 42, a circumferential aperture 41, an upper surface 43, a lower surface 45, and a circular rim 40 for seating the circumferential edge 39 of rupture disc 30. The circumferential aperture 39 is similar to or smaller than the diameter of the top of radially expanded region 25 of lower tubular member 18. The sidewalls of cylindrical portion 34 of rupture disc 30 are generally the same height as side walls 42 of shear ring 44. This can best be seen in FIG. 6, which shows an etched rupture disc 30 within shear ring 44. This assists in improving the alignment of the rupture disc assembly 10 within the casing string.

Figure 4A:
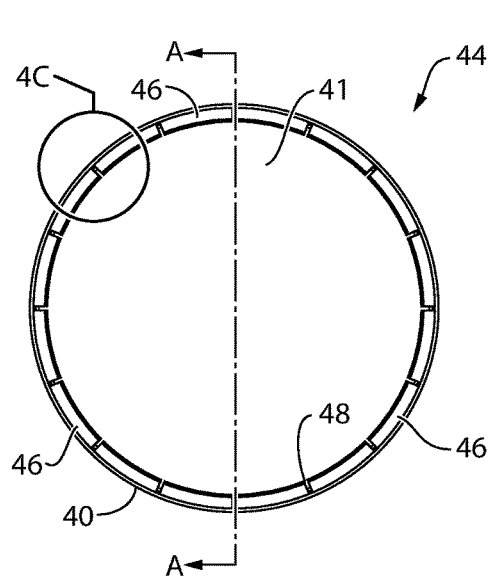
FIG. 4A is an end view of a shear ring according to one embodiment.
Figure 4B:
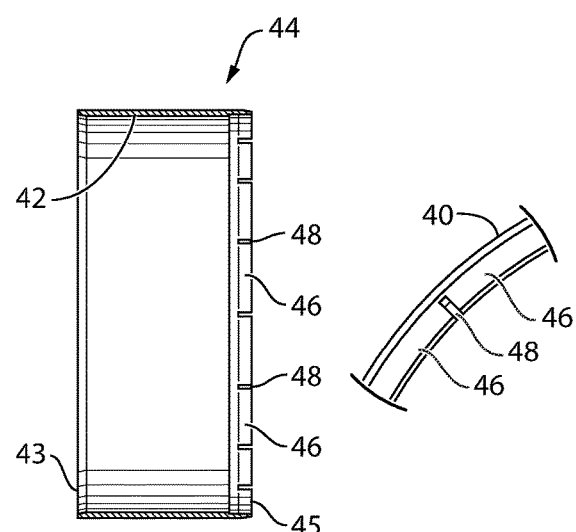
FIG. 4B is a sectional view of a rupture disc holder with a shear ring taken through line A-A in FIG. 4A.
Figure 4C:
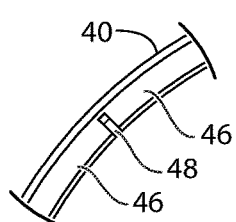
FIG. 4C is an enlarged view of a portion of two tabs on the shear ring shown in FIG. 4A.

As shown in FIGS. 4A-4C, shear ring 44 may comprise a plurality of tabs 46 spaced around the circumference of rim 40. Tabs 46 may be separated by slots or spaces 48. Tabs 46 may be bendable or shearable upon application of force (e.g. hydraulic force). For example, tabs may shear at 3,000-7,000 psi—the same pressure differential which will be across the convex side rupture disc and the concave side of rupture disc 30. This threshold pressure at which the securing mechanism shears, releasing the rupture disc, is less than the rupture burst pressure of the disc (e.g. the pressure at which the disc would break in response to hydraulic pressure alone). Tabs 46 support and/or seat rupture disc 30. Once a sufficient number of tabs 46 are sheared, rupture disc 30 may be freed or released from the constraints of shear ring 44. Rupture disc 30 then moves suddenly downward in response to hydraulic fluid pressure already being applied to convex surface 36 of rupture disc 30, being pushed through the circumferential aperture 39 of shear ring 44. Once disengaged or otherwise released from shear ring 44, rupture disc 30 will impinge upon some portion of lower tubular member 18 (e.g. tapered surface 58, herein referred to as an example of an impact surface) and break into multiple pieces as a result. Thus, surface 58 serves as an impact surface. Surface 58, because it is angled, provides a wall against which the rupture disc is forced, and thus causes the disc to rupture. Any portion of the lower tubular may constitute an impact surface, provided that the impingement of disc with the surface causes the disc to rupture. There is no need to rotate the casing string to cause the cutting surface to break the rupture disc, nor is there a need to install special sleeves within the casing string to create a cutting surface. The tubular within the casing string itself serves as the impact surface.

It is noted that in the illustrated embodiment, shear ring 44 is shown with tabs 46 extending inwardly from the circumferential rim of the ring, the disc being seated on tabs 46. Other configurations are possible. For example, the tabs may not be connected directly to the shear ring, but through various holders extending inwardly from the shear ring, the tabs being sheared from the connectors that remain with the shear ring. Also, in some embodiments, it may be possible that the tabs not be exactly at the rim of the shear ring or indeed, tabs may be attached directly to the side walls of the ring (e.g. there is no rim on the ring). In yet other embodiments, there may not be any tabs. As noted, other securing mechanisms are possible.

Essentially, the rupture disc assembly, including shear ring 44, changes the load forces on disc 30. When hydraulic pressure is applied to the disc within the assembly, there is a combination of hydraulic pressure acting on the rupture disc, as well as compressive forces forcing the rupture disc into the constricted opening on lower tubular member 18 (onto the one or more impact surfaces). The disc, seated on the tabs of the shear ring, is released and moves downward once the tabs are sheared. The combination of the hydraulic force and the impact force against an impact surface allow for shattering of the disc (e.g. the disc is impelled to impact against an impact surface on the lower tubular member by the continued hydraulic pressure). The shattering of rupture disc 30 results in opening of passageway 14 of lower tubular member 18, so that the casing internal diameter in that region of lower tubular member may be restored to substantially the same diameter as the rest of the casing string (e.g. the casing string above and below the tubular or region in which the rupture disc was installed).

Shear ring 44 may be generally made of metal, such as brass, aluminum, various metal alloys, ceramics, and other materials may be used, provided that tabs 46 (or similar breakable projections) can be suitably bent or sheared off upon downward movement of rupture disc 30. It is also noted that tabs 46 are small enough that when sheared, they do not affect wellbore equipment or function. Also, because the ring and tabs may be constructed of acid soluble material, the tabs may dissolve, depending on the fluid circulated down the wellbore.

Rupture disc 30 may be made of frangible material. For example, the disc 30 may be made of materials such as carbides, ceramic, metals, plastics, glass, porcelain, alloys, composite materials, etc. These materials are frangible and rupture in response to either a sharp blow or in response to a pressure differential when high pressure is applied to the concave side of the disc. Thus, hemispherical discs are preferred because of their ability to withstand pressure from the convex side. The rupture disc must have sufficient rupture strength to prevent premature opening when the casing string is run into the well.

Rupture disc 30 may be calibrated to rupture at a predetermined pressure in response to a pressure differential when high pressure is applied to the convex surface 36 of disc 30. The disc 30 should have a threshold rupture pressure that is greater than the hydraulic pressure required to bend or shear tabs 46 (or other projections) on shear ring 44. This feature helps to ensure that the rupture disc 30 does not rupture as a result of hydraulic pressure alone (because the threshold rupture burst pressure of the disc 30 may exceed a pressure that is suitable for maintaining casing integrity), but rather may be ruptured by being forced against surface 58 of the lower tubular member 18. One example of a suitable rupture disc 30 is the burst disc offered by Magnum Oil Tools International, LLC (Corpus Christi, Tex. 78405) [www.magnumoiltools.com/assets/files/Magnum_Single%20Magnum Disk_04-30-2012Back.pdf]. See also U.S. Pat. No. 5,924,696 to Frazier. Alternatively, appropriate discs may be manufactured to suit particular needs.

Rupture disc assembly 10 provides a way for a sealed casing string to become unsealed while requiring less hydraulic pressure than prior art rupture disc approaches. This is because the presence of shear ring 44 (or other securing mechanism) allows pressure to be built up against the upper surface 38 of the rupture disc until the point is reached at which shear ring suddenly gives way. The resulting sudden downward impulse experienced by the rupture disc causes it to forcefully impact on the impact surface of the lower tubular. The sudden acceleration and just-as-sudden deceleration of the rupture disc thus caused—combined with the tendency of frusto-conical shape of surface 58 to apply deformation forces against the rupture disc and further combined with the continuing hydraulic force on surface 38—result in the rupturing of disc 30. By contrast, greater hydraulic pressure would be required to rupture the same disc if the only mechanism at play to rupture the disc were to be the hydraulic pressure itself.

Without being bound by theory, in the present rupture disc assembly, the impact force on rupture disc 30, combined with the hydraulic pressure, accomplish the breaking of rupture disc. The impact force, combined with the deformation of the disc caused by the taper of impact surface 58, compensate for the fact that the hydraulic pressure is less than what would be required if only hydraulic pressure was being used. Likely, rupture disc 30 would not reliably and/or fully break apart if the hydraulic pressure were to be removed at the exact moment that shear ring 44 releases rupture disc 30, and disc 30 begins its downward movement. The combination of the impact force and deformation, along with the applied (lower than would otherwise be required) pressure may cause the disc to break.

There are various reasons why the combination of hydraulic pressure, and the impact force, is useful for breakage of the disc, as opposed to use of hydraulic pressure alone. For example, when the discs are made of ceramic, breakage of the disc using hydraulic pressure alone may not be that reproducible. The discs may be susceptible to point loading, and imperfections in machining of the discs could cause the discs to break prematurely. Also, each disc would have to adjusted to suit each particular hydraulic pressure rating, which would be difficult and time-consuming. The present rupture assembly avoids this need by relying on a combination of forces and not on hydraulic pressure alone. Finally, it is likely that for hydraulic pressure alone to be the sole breaking mechanism, the discs would have to be manufactured to be thinner, which is difficult to achieve.

The present Applicant has found that a rupture disc having side walls on the cylindrical portion 34 generally corresponding in height to side walls 42 of the continuous side surface of the shear ring to be useful. For example, the side walls of the rupture disc may be about 2.0 to 2.5 inches in height, when the rupture disc is installed in 4.5 or 5.5 inch casing. This allows for greater stability of the rupture disc assembly within the casing string. In addition, to improve the breakability of the rupture disc, various other modifications of the disc may be adopted. For example, the rupture disc may be of an overall smaller thickness. The thinner the disc, the greater the likelihood that the disc will be shattered into sufficiently small pieces that will not impair wellbore function. For example, a suitable disc may have a thickness of $\frac{3}{16}$th inches. In any event, the rupture disc should be thick enough to avoid premature rupture.

Figure 5:
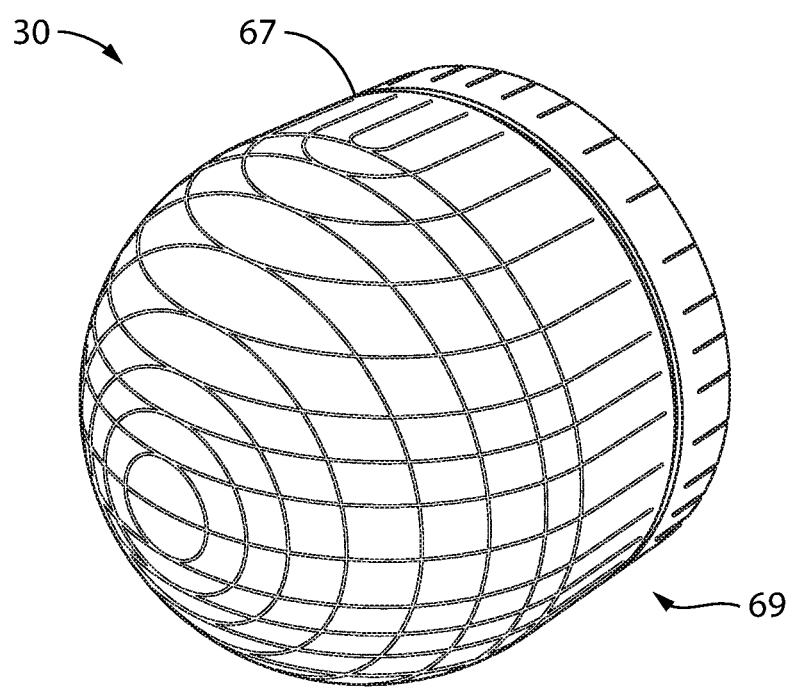
FIG. 5 is a perspective view of the rupture disc according to one embodiment, showing the surface etched in a grid-like pattern.

Another modification to improve breakability of the disc is to etch, score, engrave or form grooves in the outer surface of the disc. For example, rupture disc 30 may be etched in a grid-like pattern shown in FIG. 5. The etching, scoring, etc. may be accomplished by drawing an etching tool, a knife edge or other sharp tool along an outline made on the outer surface of the rupture disc. An O-ring groove 67 holds O-ring 69. The etching, scoring or grooving provides lines of weakness to improve rupture characteristics. The disc tends to rupture along the score lines. Smaller pieces are desirable because the smaller pieces can be percolated up the casing string to surface, for example, or so that the smaller pieces can be easily swept down the casing string.

Figure 7:
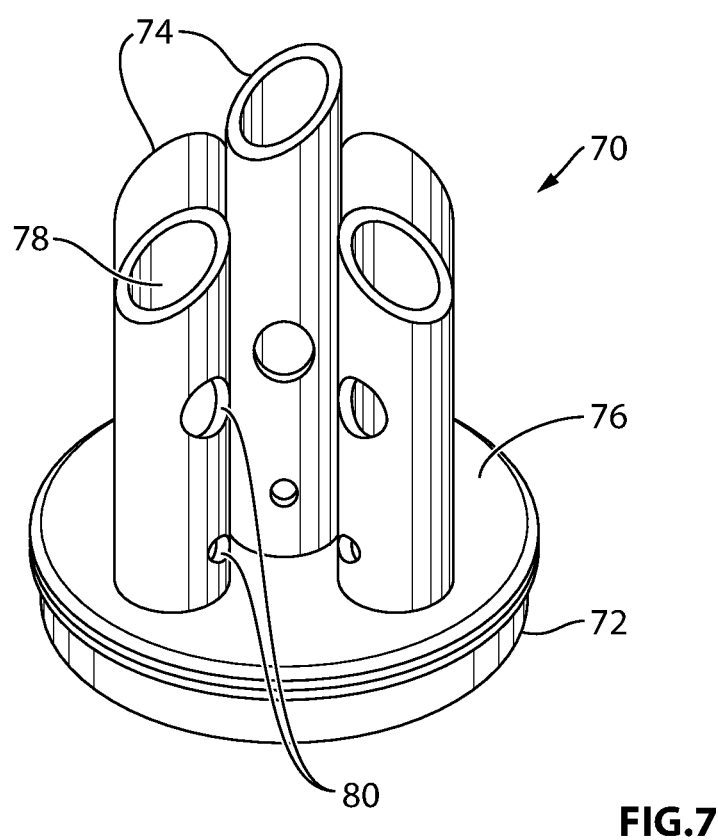
FIG. 7 is a perspective view of a debris catcher according to one embodiment that is adapted for installation in a casing string.

FIG. 7 shows an illustrative implementation of debris catcher 70 (See FIG. 1). When the well is at least partially horizontal—debris catcher 70 may be generally installed in the horizontal section of the well. Debris catcher 70 comprises a base 72 having an outside diameter approximately the same as the inner diameter of the casing string into which it may be to be incorporated. Base 72 may be externally threaded in one or more selected portions to allow placement in the casing string. A plurality of hollow projections 74 extend upwardly from base 72. Projections 74 may be substantially hollow cylinders, each defining a central fluid passageway 78 for allowing fluid to flow across debris catcher 70 and into the lower casing string. Apertures 80 may be formed in the tubular walls of projections 74. In operation, any pieces of disc 30, once ruptured, that exceed the diameter of fluid passageway 78 may generally fall onto upper surface 76 of base 72.

Thus, the debris catcher 70 may allow fluid flow through the casing string while preventing debris from disc 30, when ruptured, from clogging other equipment in the casing string (such as float devices) and damaging the casing string. Rupture disc 30 may be breakable into pieces that may be sufficiently small that their presence does not affect subsequent wellbore operations. For example, float tool 90 (see FIG. 1) may include equipment that allows fluid to percolate to the surface, carrying with it the pieces of disc 30, once shattered. Thus, debris catcher 70 may not be needed in all cases. Also, as a person skilled in the art would appreciate, other means of capturing debris from shattered disc 30 may be possible. For example, a screen or baffle device may serve as a debris catcher. The debris catcher can be any device that substantially captures the shattered pieces of the disc 30 while still allowing fluid flow down the casing string. In addition, once ruptured, a cementing plug may be delivered through the casing string to the landing collar. The cementing plug can assist in sweeping debris to the debris catcher.

Referring back to FIG. 1, in a method of using the rupture disc assembly in a float tool, once the float tool is run into the desired depth as described above, sufficient hydraulic pressure is applied. The tabs 46 on shear ring 44 may be sheared in response to the pressure, disengaging or otherwise releasing disc 30 through aperture 41 of ring 44. The continued downward movement of rupture disc 30 may cause it to engage against impact surface 58 of lower tubular member 18 with sufficient force to cause the rupture of disc 30. The shattered pieces are either swept via fluid flow and/or using a cementing plug to the debris catcher 70. Full casing ID is restored.

EXAMPLES

Weight Reduction:

In certain examples, a 54% reduction in lateral casing weight was achieved using the float tool of the present invention. In one particular example, the casing weight in air was 17.3 kg/m (11.9 lb/ft). The casing weight in water was 15.1 kg/m (10.4 lb/ft). The effective casing weight using the float tool of the present invention was 6.9 kg/m (4.8 lb/ft).

Sample Calculations:

An example calculation of surface pressure is presented. The well true vertical depth is 1,500 m (4,920 ft). The fluid density is 1,050 kg/m$^3$. The bottom hole pressure is 15.4 MPa (2240 psi). The minimum rupture burst pressure rating is therefore 2240 psi+500 psi=2740 psi. The rupture burst pressure of the assembly is 3000 psi. The surface pressure is calculated as Surface Pressure=Rupture Burst Pressure Rating less Bottom Hole Hydrostatic Pressure. In the present case, 3000 psi less 2240 psi=860 psi (5.93 MPa). In another example, if the differential pressure inside the tubing is 11,500 kpa (1,669 psi), the rupture disc should rupture at 18,600 kPa−11,500 kPa=7,100 kPa, or 1,030 psi applied surface pressure.

Example on Installation of the Float Tool:

When installing into a well, it is generally recommended that the various sweeps be used to ensure the wellbore is clean prior to installing the float tool. The float tool may be provided pre-assembled (e.g. it may include a landing collar, debris catcher, a float shoe and/or float shoe). When the float tool is not pre-assembled, it can be made up and run in the following manner. The debris catcher has a threaded base, and can be hand-screwed into the top of the float shoe. If a debris catcher such as that described herein is used, the projections face uphole. The landing collar is installed above the debris catcher, such that the debris catcher is threadedly connected between the landing collar and the float shoe/float collar. A casing joint may be installed above the landing collar, and the casing joint may be filled with drilling mud to ensure the float shoe is functioning properly. The present method allows for casing sleeves to be installed, provided that there is sufficient space between the landing collar and the sleeve. After a desired amount of liner is run in, the rupture assembly is installed. The casing is run in, filling on the fly with mud from a pill tank. Once the casing is ran, circulating equipment may be installed. The rupture disc assembly is ruptured by pressurizing the casing. Mud is swept to the ends of the casing. Fluid is circulated to condition the wellbore, and to clean mud.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A method of installing a casing in a well, the method comprising:

running a casing string into a wellbore, the casing string having an inner diameter and including a buoyant chamber formed between a seal at the lower end of the casing string and a rupture disc assembly, the rupture disc assembly comprising a rupture disc, the disc being breakable by a combination of hydraulic pressure applied to the disc to disrupt a securing mechanism holding the disc within a first tubular portion in the casing string thereby releasing the disc from the first tubular portion, and an impact force caused by impingement of the disc against an impact surface on a second tubular portion within the casing string, and rupturing the disc to restore the casing inner diameter.

2. The method of claim 1, wherein the step of running the casing string further comprises filling a region of the casing string above the seal at the lower end of the casing string with a fluid having a lower specific gravity than a fluid in the wellbore into which the casing string is being run.

3. The method of claim 1, further comprising:

capturing debris from the disc, once ruptured, in a debris catcher.

4. The method of claim 1, further comprising:

carrying out conventional cementing following rupture of the disc.

5. The method of claim 1, further comprising:

carrying out reverse cementing operations following rupture of the disc.

6. The method of claim 1, wherein the securing mechanism is a shear ring, the shear ring including a plurality of shearable tabs that initially hold the rupture disc in place.

* * * * *